United States Patent [19]

Parks et al.

[11] Patent Number: 4,562,557

[45] Date of Patent: Dec. 31, 1985

[54] METHOD AND APPARATUS FOR DETERMINING ACOUSTIC WAVE PARAMETERS FROM ACOUSTIC WELL LOGGING WAVEFORMS

[75] Inventors: Thomas W. Parks; Charles F. Morris, Jr., both of Houston, Tex.

[73] Assignee: Schlumberger Technology Corporation, Houston, Tex.

[21] Appl. No.: 372,271

[22] Filed: Apr. 27, 1982

[51] Int. Cl.$^4$ .............................................. G01V 1/00
[52] U.S. Cl. ....................................... 367/27; 367/38; 367/73; 367/75
[58] Field of Search ................... 367/25, 27, 73, 49, 367/36, 57, 58, 52, 38, 75, 33

[56] References Cited

U.S. PATENT DOCUMENTS

| | | | |
|---|---|---|---|
| 3,177,467 | 4/1965 | Brokaw | 367/27 |
| 3,302,166 | 1/1967 | Zemanek, Jr. | 367/27 |
| 3,304,537 | 2/1967 | Schwartz | 367/27 |
| 3,390,377 | 6/1968 | Elliot et al. | 367/75 |
| 4,209,854 | 6/1980 | Ruehle | 367/52 X |
| 4,210,965 | 7/1980 | Ingram | 367/27 X |
| 4,210,966 | 7/1980 | Ingram | 367/27 X |
| 4,223,398 | 9/1980 | Blalock | 367/27 X |
| 4,488,270 | 12/1984 | Ruehle | 367/38 X |

OTHER PUBLICATIONS

Helstrom, Carl W., Statistical Theory of Signal Detection, 1960 Pergamon Press, pp. 11-15.
Kay, Steven M., Marple, Jr., Stanley Lawrence, Spectrum Analysis—A Modern Perspective, 11/11/81, Proceedings IEE vol. 69, No. 11, pp. 1380-1418.
Chang and Everhart, A Study of Sonic Logging in a Cased Borehole, Schumberger-Doll Research, 9/26/82, SPE 11034, pp. 1-7.
Koerperich, Shear Wave Velocities Determined from Long and Short Spaced Borehole Acoustic Devices 9/23/79 54th Conference Society Petro. Engin.
Cheng, Velocity and Attenuation from Full Waveform Acoustic Logs, 6/23/81 SPWLA 22nd Annual Logging Symposium.
Aron et al., "Formation Compressional & Shear Interval-Transit-Time Logging . . . " 10/3/78 53rd Conf. Soc. of Petrol. Engin.
Clay, Use of a Two-Dimensional Array to Receive Unknown . . . vol. 47, No. 2 (Part 1) pp. 435-440 1970.

*Primary Examiner*—Salvatore Cangialosi
*Assistant Examiner*—Brian S. Steinberger

[57] ABSTRACT

Methods and apparatus are described for estimating parameters, such as slowness and attenuation, of composite acoustic waves obtained in the course of sonic logging of formations traversed by a borehole. Sonic energy is sensed arriving at a plurality of points spaced vertically along the borehole after refraction, reflection and direct transmission through and along the formations. A window is established of predetermined length and moveout and the composite waves are multiplied by the window. A Fourier transform is obtained of the windowed data and the data are simultaneously analyzed to obtain an estimate of the parameters. The procedure is repeated for different window moveouts and index positions along the composite waves. The analysis is performed at each window position and moveout to obtain the best estimate of the parameters.

20 Claims, 7 Drawing Figures

METHOD AND APPARATUS FOR DETERMINING ACOUSTIC WAVE PARAMETERS FROM ACOUSTIC WELL LOGGING WAVEFORMS

BACKGROUND OF THE INVENTION

1. Field of Invention

This invention relates to methods and apparatus for well logging. More specifically, this invention relates to a method and apparatus for determining parameters of acoustic waves to investigate an acoustic medium within the sphere of influence of an acoustic borehole logging tool.

2. Background of the Invention

Acoustic well logging techniques and tools are extensively described in the art. Acoustic well logging is used to provide surveys of formations traversed by earth boreholes. In particular, measurements are made of the velocities of acoustic waves to reveal valuable information concerning the type of rocks and the porosity of the rocks in the formations surrounding the borehole. A commonly measured acoustic parameter is the velocity of compressional waves. However, other acoustic wave parameters such as the velocity of shear waves and velocities of other modes of acoustic energy are also useful in evaluating the formation.

Identifying the compressional wave and measuring its velocity is generally not difficult. It is the fastest propagating wave in the formation, is non-dispersive, and is the first to reach an array of borehole receivers when a short burst of energy from a nearby transmitter propagates through the formation. By measuring the arrival times of these waves at the receivers, the wave velocity in the vicinity of the array can be inferred.

Measuring shear velocity is considerably more difficult. Because it propagates more slowly through the formation the shear wave arrives later in time. Therefore, its arrival is typically obscured by compressional energy, and velocity determination directly from arrival time then becomes impossible.

An acoustic well logging tool for measuring the velocity of acoustic waves typically employs a sonic pulse transmitter and a plurality of sonic receivers selectively spaced from the transmitter. The sonic receivers include transducers to convert the incident acoustic wave to an electrical waveform and suitable amplifiers to transmit the waveforms to surface located processing equipment.

The spacings between the sonic receivers and the transmitter influence the character of the parameter measurement. For example, a longer spacing enables a greater effect of the formation characteristics on the sonic wave with a possibility that wave analysis can thus reveal more useful data about the formation. On the other hand, a longer spacing results in the arrival of greatly attenuated sonic waves making their analysis more difficult. Current sonic well logging tools commonly use one transmitter with a plurality of sonic receivers. A double pair of transmitter-receivers has been used in the art, for example to provide compensation for a physical misalignment of the tool in the borehole as described in U.S. Pat. No. 3,304,537 to Schwartz. A three receiver, single transmitter sonic well logging tool has been described in U.S. Pat. No. 3,390,377 to Elliott et al and U.S. Pat. No. 4,210,966 describes a technique for determining parameters of acoustic waves employing a system having a transmitter and four receivers. Generally, when the number of receivers is increased to improve the velocity measurement, special techniques are needed to process the increase in the flow of signals and enhance the accuracy of sonic wave parameter measurements.

The prior art further discloses several methods for determining acoustic wave parameters in well logging operations. One such method, a first-motion detection, is particularly applicable to measuring the transit time of the formation compressional waves. Another technique, multifold correlation, has been applied to segments of compressional wave forms detected at various spaced positions to refine the results of the first motion detection. It has also been used for determining other acoustic parameters such as shear wave velocity. Additional techniques include pattern comparison, measurement of correlation between waveform segments as a function of wave form locations, and, particularly in the seismological field, frequency and phase analysis to detect speed and direction of propagation.

While such methods furnish good information about the characteristics of the earth formations being measured, they generally require assumptions of parameters or earlier measurements such as of compressional velocity to correctly estimate the velocity of such wave components as shear waves and the velocity of modal waves. Many of the techniques also do not work well in broad ranges of lithologies, or are difficult to interpret. A need therefore remains for a more accurate, more versatile and more reliable method and apparatus for compressional, shear and modal acoustic velocity borehole logging.

SUMMARY OF THE INVENTION

The above needs are met with methods and apparatus of the present invention. In particular a method and apparatus are provided for estimating or determining the velocities of various wave components of signals received from a linear array of sonic well logging receivers. The method of determining or estimating parameters of these composite acoustic waves arriving sequentially at a plurality of points spaced vertically along the length of a borehole generally comprises the steps of generating acoustic energy in the borehole and receiving that energy at each of the points after refraction, reflection and direct transmission through and along the formation adjacent to the borehole. A window is established having predetermined length and moveout. This window is positioned along the composite wave and the energy received is multiplied at each point by the window which is delayed by an amount proportional to the transmitter-receiver spacing thereby attenuating interfering waves. A Fourier transform is generated of that portion of the received energy multiplied by the window to produce a plurality of complex signals in the frequency domain which simultaneously are analyzed to obtain an estimate of the parameters. A different moveout is then established for the window and for each different moveout position the Fourier transform is produced and analyzed. The window is then incremented along the composite waves and the above steps of multiplying, transformation and analysis are performed to obtain the best estimate of the parameters.

The analysis includes the formulation of a model for signals arriving at an array of receivers containing a plurality of propagating waves. Specifically the Fourier transformed data is modeled in the sum of exponentials with unknown spatial frequencies. The spatial frequencies, and therefore slownesses, the inverse of velocities, are determined using an estimation algorithm, such as Prony's method. Signal attenuation, a parameter in the model, is also determined in the course of utilizing the estimation algorithm.

A clustering technique is utilized to determine the best estimates of slowness and attenuation. A value of slowness is assigned to each cluster based on a weighted combination of the members of the cluster. A sonic log is made by plotting the values as a function of depth.

It is an object of the present invention to provide an improved method and apparatus for measuring and determining the physical characteristics of earth formations penetrated by a borehole. A method and apparatus are employed in which propagation velocity characteristics of acoustic waveforms transmitted through such earth formations, such as compressional waves, shear waves, Stoneley waves, and casing waves, are measured and determined utilizing at least two serially spaced sonic transducers or receivers and preferably eight sonic transducers. It is also an object of the present invention to detect and determine the parameters of waveforms whose onset or time occurrence takes place during the duration of a previously arriving waveform. Other objects and advantages of the invention will be apparent from the following description taken into conjunction with the accompanying drawings.

DESCRIPTION OF THE PREFERRED EMBODIMENT

Figure 1:
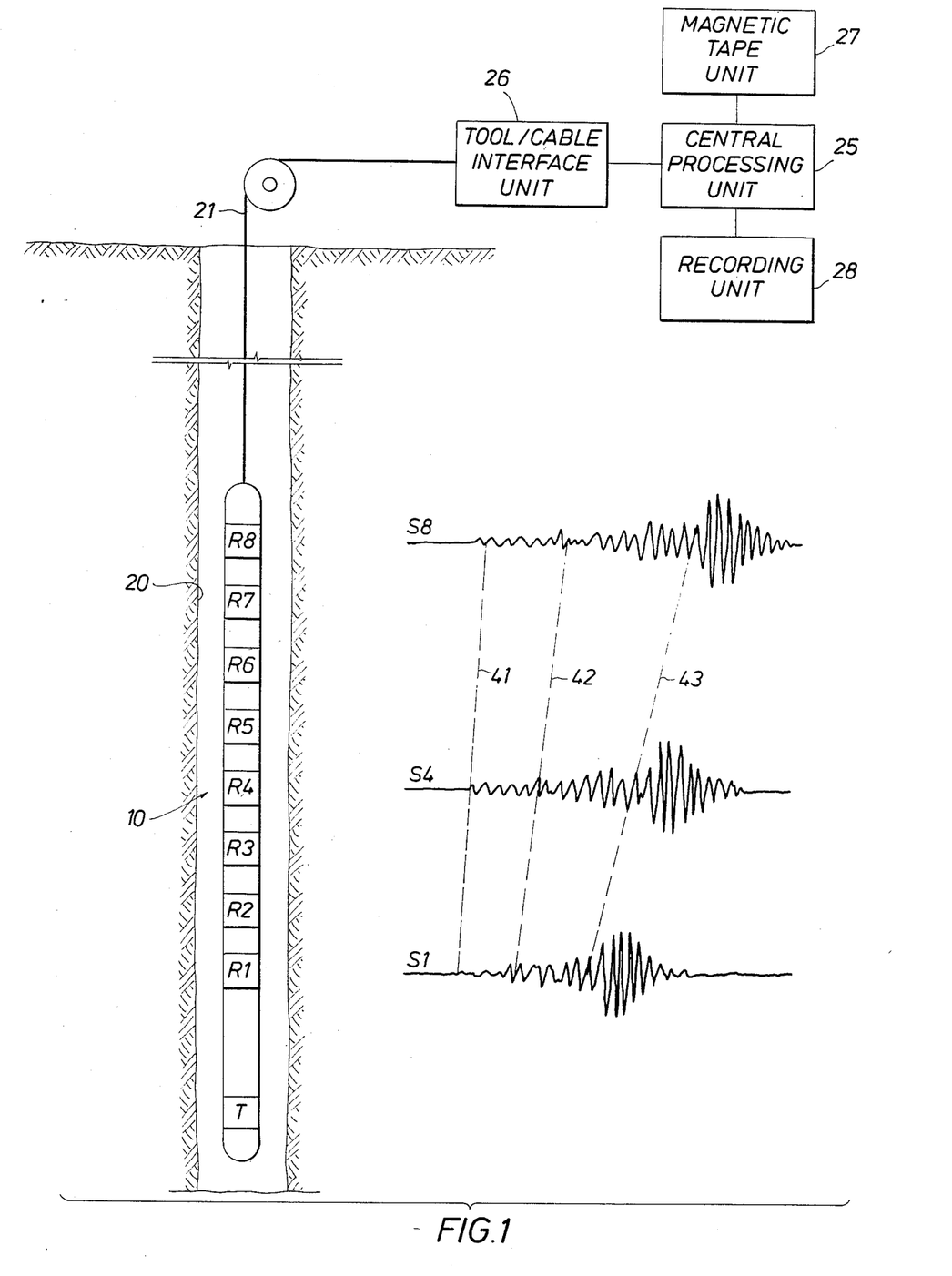
FIG. 1 is a figurative illustration of a borehole logging system according to the present invention.

The method and apparatus described herein may be applied to a wide class of acoustic logging tools. A diagram of a suitable tool or sonde 10 is shown in FIG. 1. It includes a transmitter T used to generate acoustic energy in the form of sonic pulses in the borehole fluid surrounding the sonde 10. A minimum of two transducers can be used as sonic pulse receivers for the reception of acoustic energy propagating through the formation. It is preferred however that the sonde 10 include eight receivers R1–R8 for purpose of resolution and other reasons which will be explained hereinafter. The transmitter T is spaced a distance, approximately eight feet, from the near receiver R1 and each of the receivers is linearly spaced one from the other a distance of about six inches. Bow-spring centralizers (not shown) help keep the sonde 10 centered in the borehole 20.

Several times each second, on command from surface control and processing equipment, transmitter T is excited or fired. Commands are sent down the wire-line cable 21 supporting the sonde 10 in the borehole 20 and are decoded in electronic equipment (not shown) interconnecting the cable 21 and the sonde 10. The received waveforms resulting from each firing are amplified and transmitted up the cable 21 to the surface equipment. The mode of transmission may be either analog or digital. If it is digital, the amplified waveform values are sampled at a regular prescribed rate, typically 100,000 to 200,000 times a second, then digitized in the downhole electronics equipment. The digitized signals are then telemetered up the cable as a sequence of binary numbers. If it is analog, the amplified waveforms are passed directly up the cable and are digitized in the surface equipment.

The surface equipment typically includes a central processing unit 25, a tool-cable interface unit 26, a magnetic tape recording unit 27 and a recording unit 28. Other equipment may also be provided, for exammple, a depth measuring means (not shown) well known in the art for producing a function indicative of tool position at the time sonic measurements are made. A program executed in the central processing unit 25 issues commands to the sonde through the tool/cable interface unit 26 for initially firing the transmitter. It also retrieves the waveform data either from a telemetry module in the tool/cable interface unit 26 if digitization is performed downhole, or from a digitizer module in the interface unit 26, if analog transmission is used. In either case these waveform data are recorded using the magnetic tape unit 27. The program may also process the waveform data at the well site using the method of the present invention and record the resulting compressional, shear and perhaps modal velocities utilizing the recording unit 28. Typically the recording unit 28 is of the optical film recording type. Otherwise, processing is performed by a central processing unit located in a center remote from the well site using the recorded tapes from the magnetic tape unit 27.

When the transmitter T is excited it emits an oscillatory burst of acoustic energy in roughly a 5 kilohertz to 25 kilohertz frequency band. This burst begins to propagate more or less spherically outward from the transmitter T as a compressional (pressure) wave 31 in the borehole fluid. As the wave passes into the formation its direction of propagation changes as the refracted ray diagrams of FIG. 2 indicate and its speed increases to that of sound in the specific rock composition. At the same time, some of the energy is converted into shear waves 30 propagating in the formation but at a velocity lower than the compressional velocity.

Figure 2:
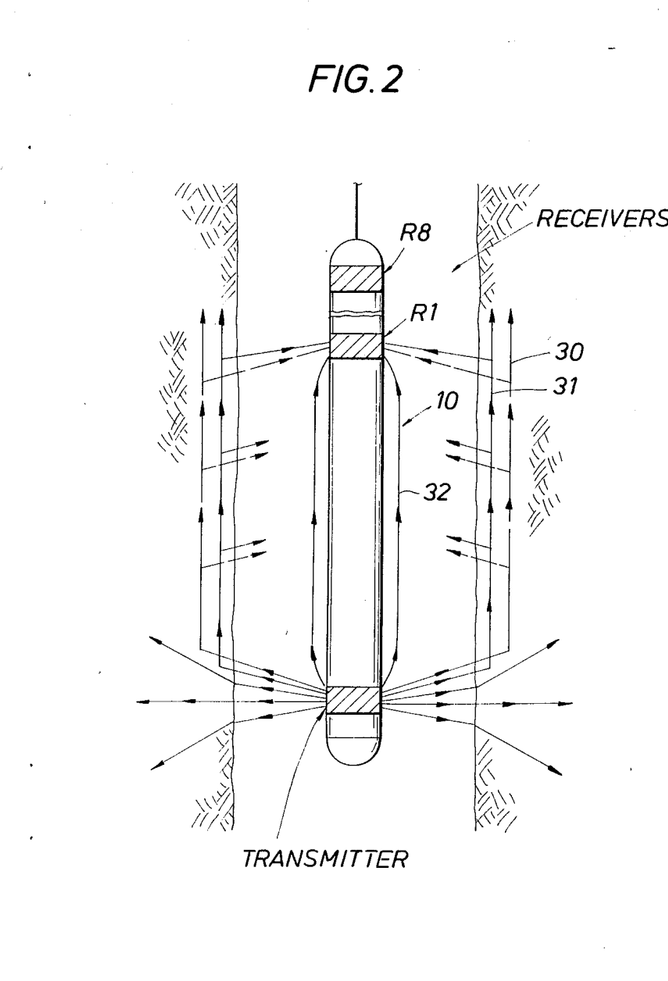
FIG. 2 is a ray diagram depicting propagation of acoustic waves in the borehole and adjacent earth formations.

The waves of interest principally are the compressional waves 31 and the shear waves 30 that travel along the borehole wall just inside the formation. As they propagate, these waves continually couple energy back into the borehole fluid in the form of compressional waves. At the same time some of the transmitted energy is propagated directly in the borehole fluid as a fluid wave 32, guided by the borehole and tool at speeds near that of sound in an unbounded fluid.

There are, therefore, three ways for acoustic energy to propagate from transmitter to receiver: through fluid, then the formation, then fluid, all as compressional waves 31; through fluid as compressional, then formation as shear waves 30 then fluid as compressional; and completely through the fluid as a fluid wave 32 guided in the borehole. There are other modal type waves than the fluid wave which for purposes of simplifying the drawing have not been illustrated in FIG. 2. The formation compressional wave travels the fastest and thus is first to arrive at the receiver. The fluid wave 32 is usually last to arrive, and the shear wave 31 arrives sometime in between.

Sonic energy of the type described in conjunction with FIG. 2 arrives successively at each of the receivers R1–R8 of FIG. 1 following each firing of the transmitter T. Preferably there is detected in conjunction with each firing of the transmitter T the acoustic energy arriving at each of the receivers R1–R8 to produce a composite wave or wave train similar to that identified as S1. Similar wave trains S4 and S8 are shown arriving at receivers R4 and R8. Wave trains S2, S3, S5, S6 and S7 have been omitted from FIG. 1 to simplify the drawing but their presence can be readily visualized. In the alternative the surface equipment can be programmed to sequentially select the receivers R1–R8 so that eight firings of the transmitter would be required for each suite of measurements.

The arrival of the wave trains at each of the receivers is a function of the characteristics of the earth formation being traversed by the sonic energy and the delay encountered as between the arrival of the wave train at successive receivers is a function of the spacing between the receivers. With the receivers equally spaced, as shown, the delay of the compressional portion of the wave train S1 is represented by dash line 41, the delay in the shear wave portion of the wave train S1 is illustrated by the dash line 42 and the delay of a modal wave, as represented by the fluid wave, is illustrated by dash line 43. The slope or moveout of the lines 41, 42 and 43 is representative of the velocities of the various wave components of the wave trains S1–S8. Therefore, one would assume that it would only be necessary to detect visually or otherwise the onset of the various component waveforms, draw the lines 41, 42, 43, take their slope and determine the velocities of the various waveforms. However, in practice the waveforms are not so clearly delineated and indeed tend to overlap such that the shear wave arrival occurs during the subsistence of the compressional wave, and the fluid wave or other modal waves such as the Stoneley wave interfere with one another making it difficult by ordinary techniques to detect the onset and, therefore, determine the slope of the lines or moveout lines 41, 42 and 43.

In accordance with the present invention there are provided method and apparatus for the analysis of composite sonic waveforms resulting in the production of sonic logs accurately representing either the slowness or the velocities of the various waveforms where the waveforms themselves interfere with one another. In the practice of the present invention data are obtained of the type illustrated in FIG. 3 comprising the wave trains S1–S8 shown in analog form, realizing, however, that the data will be in fact digital data in binary format.

Figure 3:
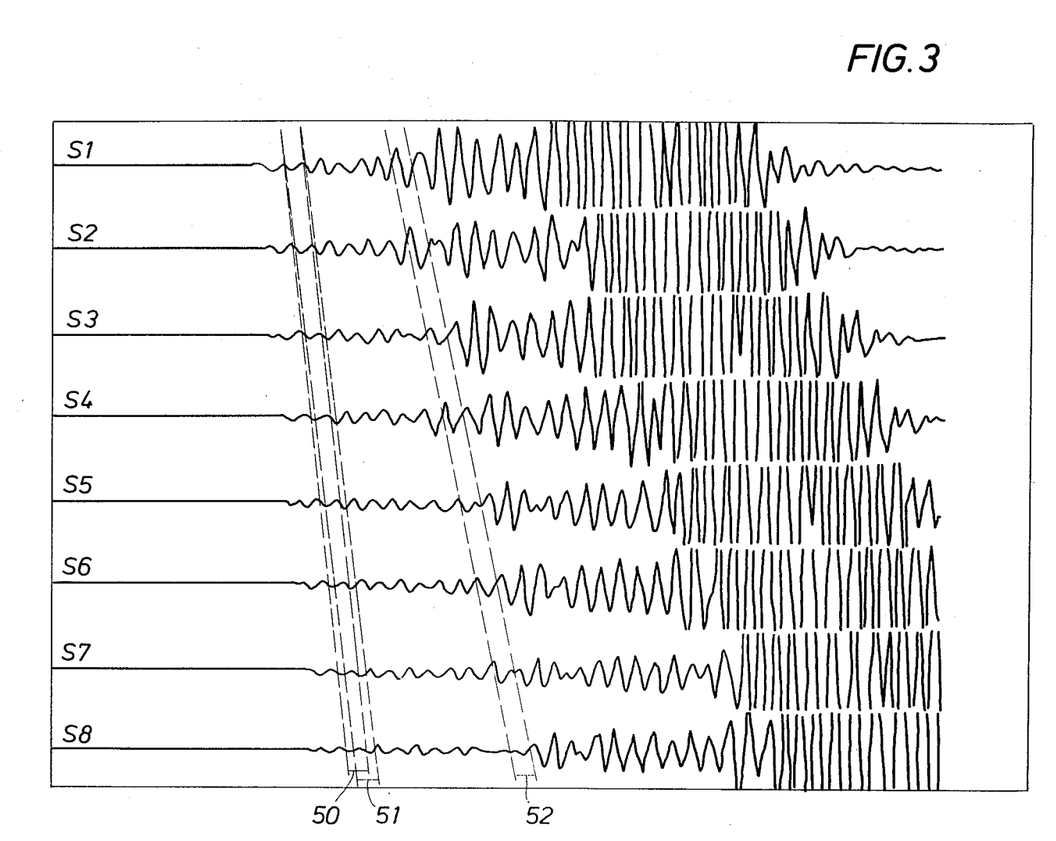
FIG. 3 illustrates a suite of typical waveforms produced at each of a series of spaced transducers in response to the generation of a pulse of sonic energy at a transmitter and also illustrating the indexing and moveout of a window.

As an initial step the data are sampled utilizing a window, for example a Hanning window function, beginning at approximately the onset of the wave trains and having a predetermined moveout. The data are multiplied by the window and each multiplication is stored. For a more detailed explanation of windowing reference may be made to copending application Ser. No. 310,333 filed Oct. 9, 1981 entitled Compressional and Shear Velocity Logging Method and Apparatus assigned to the same assignee as the present application.

During the course of operation the window 50 assumes the moveout illustrated and after all the data are gathered the window is rotated to another moveout position shown at 51. In one embodiment the Hanning window had a duration of 500 microseconds and each step or rotation of the window was 10 microseconds per trace. Where the receivers R1–R8 are six inches apart this amounts to a step or rotation of 20 microseconds per foot. An unambiguous spatial frequency range of two cycles per foot is desired. Therefore, the close spacing of the receivers R1–R8 is dictated to satisfy the sampling theorem thus to avoid aliasing.

The moveout of the window in an initial position may be 40 microseconds per foot and the next moveout position would be 60 microseconds per foot. Subsequent moveouts would be 80, 100 and 120 microseconds per foot. After sampling all the data within the window for a given index and series of moveouts, the window is indexed or incremented along the waveform approximately 50 microseconds and again the data is sampled with the window at the above described moveouts. One such window index is indicated at 52. The procedure continues until all the data of interest have been sampled. In practice the range of window positions is determined by calculating the earliest and latest possible arrival times of sonic energy from the known distance between the transmitter and the receiver array.

A term that has come to be utilized more and more in sonic logging is slowness. It is the inverse of velocity and can be expressed as $p = k/f$ where: p is slowness in seconds per foot, k is spatial frequency in cycles per foot, and f is temporal frequency in cycles per second.

Utilizing the concept of slowness one can express a model for signals arriving at an array of receivers which signals contain N propagating waves as $$s(m,n,l) = p_1{}^l q_1(n - lp_1) + p_2{}^l q_2(n - lp_2) + \cdots p_N{}^l q_N(n - lp_N) \qquad (1)$$

Where:
s is the signal,
m is the window position,
n is the time index along the trace or waveform,
l is distance, in this case the position of a receiver,
$\rho$ is attenuation,
q is an unknown waveform which also depends on the term m, and
p is slowness Having established a model for the wave train an estimation procedure is employed to determine the slowness p for each waveform of interest and also to determine whether, indeed, a particular waveform is present. The waveforms include compressional, shear and fluid waves. In some instances encountered in sonic logging a shear wave is absent. By way of the present invention not only is there determined the presence or absence of the waveforms but when present there is determined their slowness and attenuation.

A number of techniques are available for estimation of parameters in the above model. One estimation technique involves using the Prony estimation algorithm as more fully described in "Spectrum Analysis—A Modern Perspective" by S. M. Kay and S. L. Marple published in PROC. IEEE Vol. 69, No. 11, pp 1380–1419, Nov., 1981. This technique was found to provide a good procedure for estimating the parameters of the model under the physical conditions encountered in sonic logging.

Figure 4:
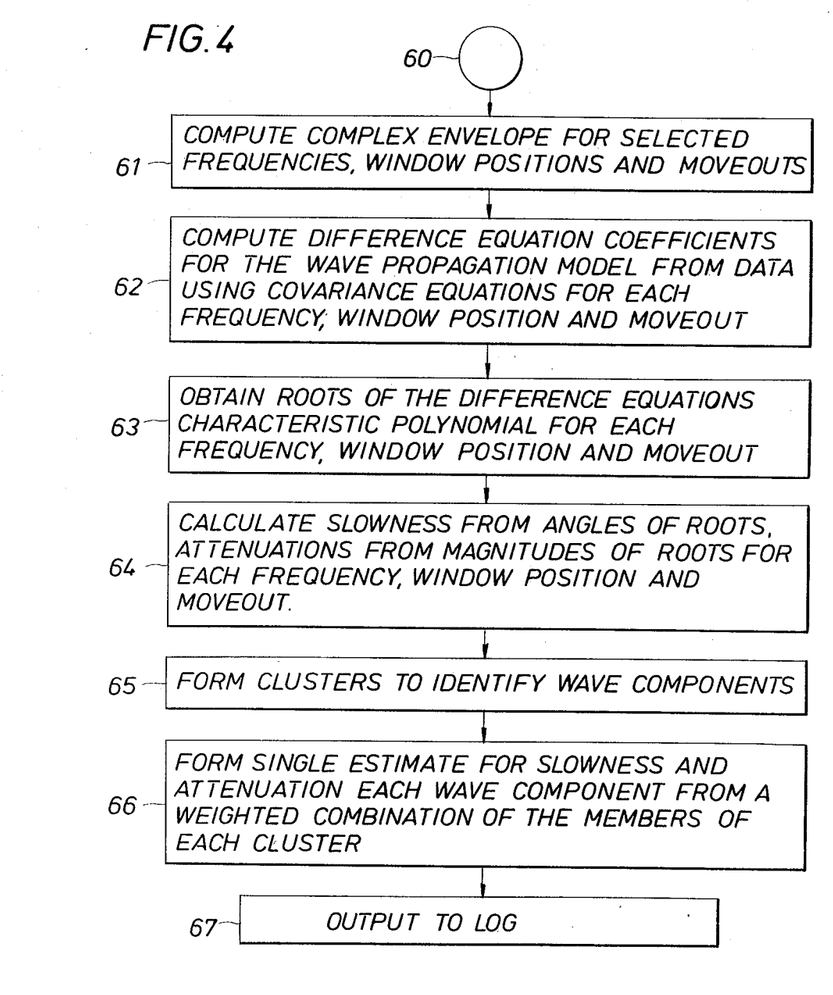
FIG. 4 is a flow diagram representative of a method of the invention.

In carrying out the technique as illustrated in FIG. 4 to determine the values of slowness the Fourier transform of expression (1) where N=2, is obtained as $$S(l) = Q_1(f_o)\rho_1{}^l e^{-j2\pi f_o l p_1} + Q_2(f_o)\rho_2{}^l e^{-j2\pi f_o l p_2} \quad (2)$$

where fo is temporal frequency.

The sampled, windowed data are applied by way of input interface 60 to block 61 where complex envelopes are computed as required for expression (2). The envelopes are computed for selected frequencies fo, window positions and moveouts.

By introducing ratios r expressed as $$r_1 = \rho_1 e^{-j2\pi f_o p_1} \quad (3)$$

and $$r_2 = \rho_2 e^{-j2\pi f_o p_2} \quad (4)$$

expression (2) can be rewritten as the sum of geometric sequences $$S(l) = Q_1(f_o) r_1{}^l + Q_2(f_o) r_2{}^l \quad (5)$$

Expression (5) being the sum of two geometric sequences, the spatial spectrum of the sequences is a rational function and therefore there can be directly evaluated the transform over all values of S(l).

It will be appreciated that while the model for the measured data, expression (1), satisfies a homogeneous second order difference equation, the measured data itself does not exactly follow the model, and therefore does not satisfy the homogeneous second order difference equation. Therefore, an error term is introduced and the difference equation can then be expressed as $$S(l) + b_1 S(l-1) + b_2 S(l-2) = \epsilon_l \quad (6)$$

where $b_1$ and $b_2$ are coefficients of the difference equation, and $\epsilon_l$ is the error term.

Accordingly $b_1$ and $b_2$ must be chosen to minimize $\Sigma |\epsilon_l|^2$.

This is done by establishing the matrix $$\begin{bmatrix} S(2) & S(1) & S(0) \\ S(3) & S(2) & S(1) \\ S(4) & S(3) & S(2) \\ S(5) & S(4) & S(3) \\ S(6) & S(5) & S(4) \\ S(7) & S(6) & S(5) \end{bmatrix} \begin{bmatrix} 1 \\ b_1 \\ b_2 \end{bmatrix} = \begin{bmatrix} \epsilon_0 \\ \epsilon_1 \\ \epsilon_2 \\ \epsilon_3 \\ \epsilon_4 \\ \epsilon_5 \end{bmatrix} \quad (7)$$

and solving the matrix utilizing the convariance matrix solution $$\begin{bmatrix} b_1 \\ b_2 \end{bmatrix} = \begin{bmatrix} \sum_1^6 |S_l|^2 & \sum_0^5 S_{(l)} S^*_{(l+1)} \\ \sum_0^{5*} S_{(l)} S_{(l+1)} & \sum_0^5 |S_l|^2 \end{bmatrix}^{-1} \begin{bmatrix} \sum_1^6 S^*_{(l)} S_{(l+1)} \\ \sum_0^5 S^*_{(l)} S_{(l+2)} \end{bmatrix} \quad (8)$$

where * indicates conjugation.

The solution is performed by block 62 of FIG. 4 where difference equation coefficients are determined using covariance equations for each frequency, window position and moveout. Having determined the coefficients $b_1$ and $b_2$, the values of slowness can be established using the theory of difference equations as proposed in the Prony technique.

The characteristic polynomial of the difference equation is $$Z^2 + b_1 Z + b_2 = (Z - r_1)(Z - r_2). \quad (9)$$

Factoring of expression (9) gives roots $r_1$ and $r_2$ in the form illustrated in expressions (3) and (4) above. The value of the roots is obtained in block 63 (FIG. 4) again for each value of frequency, window position and moveout.

To get the values of slowness the following $$p_1 = -\frac{\arg r_1}{2\pi f_o} \quad (10)$$

$$p_2 = -\frac{\arg r_2}{2\pi f_o} \quad (11)$$

In addition there is obtained by the process represented by block 64 the value of attenuation by taking the absolute values of the roots $r_1$ and $r_2$.

The result of the computation in block 64 is a mass of data representing slowness and attenuation, but only selected values are valid. The selection process employs the criteria that the computed value of slowness must be within plus or minus 10 microseconds of the window moveout whose data was used to compute that slowness. All other values of slowness are biased and are rejected.

Figure 5:
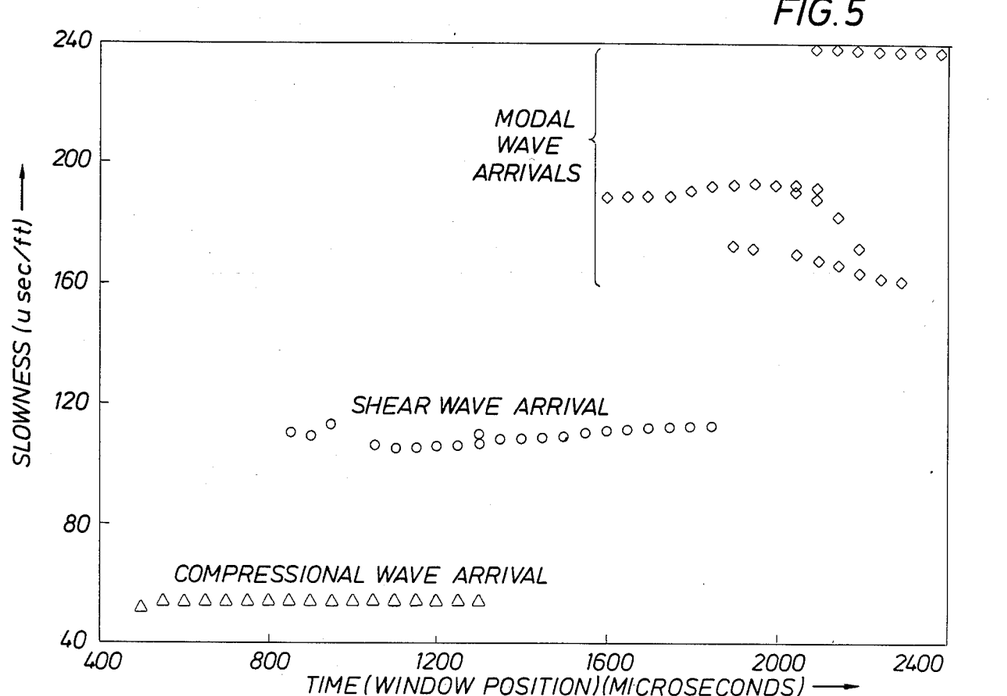
FIG. 5 is a plot of slowness, the inverse of velocity, with respect to time.

The accepted values of slowness are assembled in terms of temporal frequency and window position or time. For example for waves analyzed at 14 Khz there is shown in FIG. 5 the accepted values of slowness plotted with respect to time. There appears in FIG. 5 representations of compressional wave arrivals, shear wave arrivals and modal wave arrivals such as fluid waves. The values of compressional wave arrival are fairly constant while the shear wave arrivals vary in slowness (there are two unexplained anomalies) probably due to dispersion introduced by windowing. It is of interest to note that the early portion of the shear wave occurs during the continuation of the compressional wave and that the modal waves arrive during the continuation of the shear wave.

Figure 6:
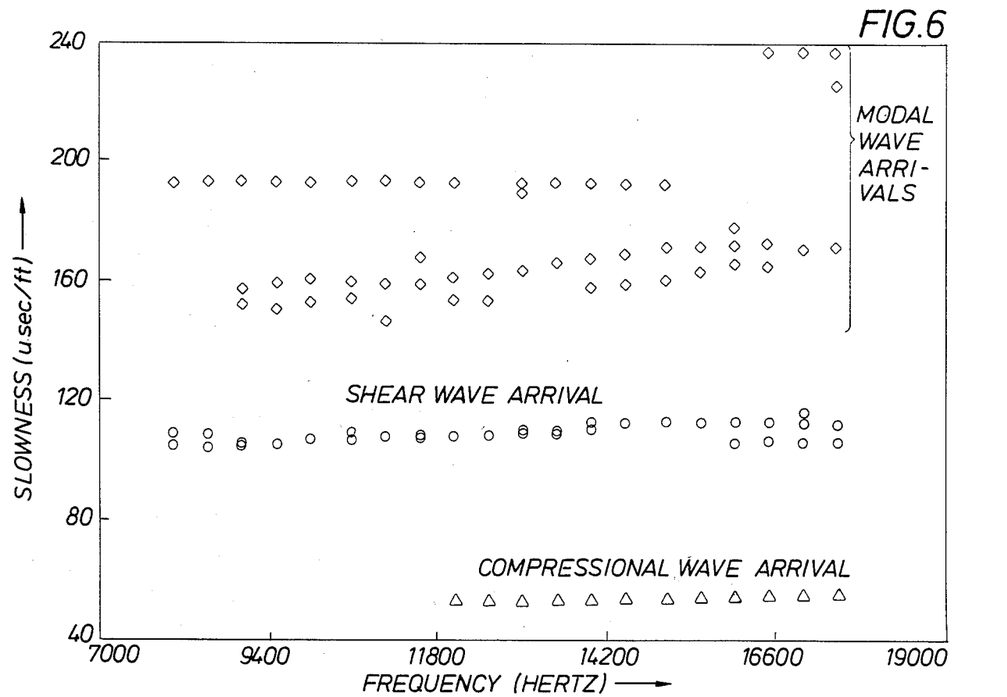
FIG. 6 is a plot of slowness with respect to frequency.

There are a plurality of assemblies similar to FIG. 5, one for each selected temporal frequency. FIG. 6 illustrates data obtained with the slowness plotted as a function of frequency. One such plot is made for each selected window position.

Figure 7:
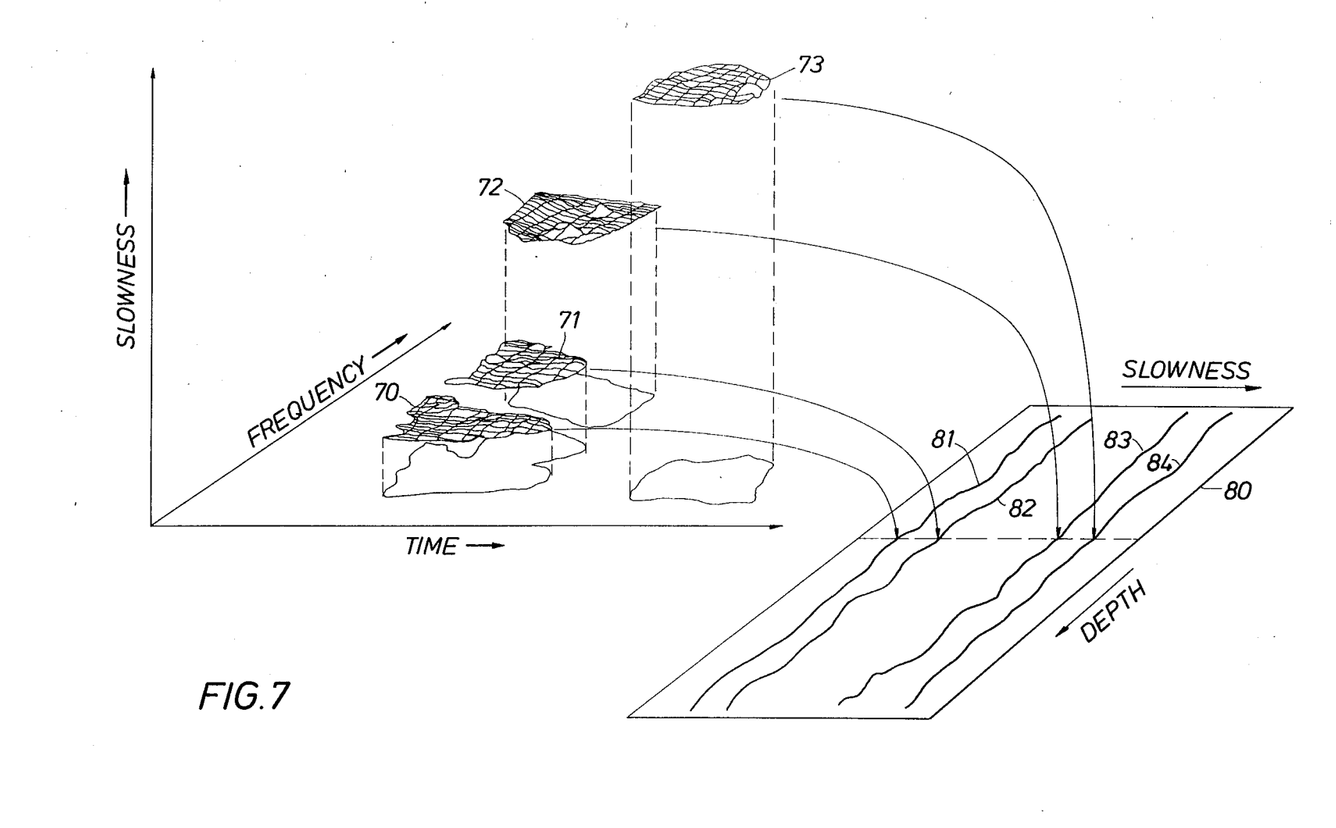
FIG. 7 is a pictorial representation of clustering and the production of a sonic log in accordance with the present invention.

In order to determine the best signal estimate of slowness and attenuation a clustering technique is performed in block 65. The result of clustering is illustrated in FIG. 7. There the data is plotted in three dimensions: slowness, frequency and time. Clusters 70, 71, 72 and 73 respectively represent compressional, shear, fluid and Stoneley waves. From a family of such clusters a slowness log 80 is formed by assigning, as represented by block 66, to each cluster a value of slowness, based on a weighted combination of the members of the cluster, and plotting, as represented by block 67, that value as one point along the depth axis of the log. Plotting the selected values as points as a function of depth results in a log including a compression wave trace 81, a shear wave trace 82, a fluid wave trace 83 and a Stoneley wave trace 84.

The above described technique and modifications thereof are preferably performed with a properly programmed digital computer such as a VAX 11/780 manufactured by the Digital Equipment Corporation of Maynard, Mass. It is recognized that the plots of FIGS. 5 and 6 and the clustering shown in FIG. 7 are for illustrative purpose only and that the arrays of data, clustering and selection are to be performed in the computer under control of programs made obvious to those skilled in the art by way of the enabling disclosure set forth above.

We claim:

1. A method of estimating parameters of composite acoustic waves arriving sequentially at a plurality of points spaced vertically along the length of a borehole comprising the steps of;
   (a) generating acoustic energy in the borehole,
   (b) receiving the acoustic energy at each of the points after refraction, reflection and direct transmission through and along a formation adjacent the borehole to produce a composite acoustic wave the parameters of which are to be estimated,
   (c) establishing a window of predetermined length and moveout,
   (d) positioning said window along the composite wave,
   (e) multiplying the energy received at each point by the window,
   (f) generating the Fourier transform of that portion of received energy multiplied by the window, to produce a plurality of complex signals in the frequency domain,
   (g) simultaneously analyzing said complex signals to obtain an estimate of the parameters by fitting this signal to a model including for wave propagation defining a superposition of acoustic propagation at different velocities,
   (h) establishing different moveouts for said window,
   (i) at each different moveout position, repeating steps (e) through (g),
   (j) incrementing said window along said composite waves, and
   (k) repeating steps (e) through (i) at each incremented position of said window to obtain the best estimate of the parameters.

2. The method of claim 1 wherein the composite wave incudes compressional wave components and shear wave components and a parameter being estimated is the slowness of said compressional wave and shear wave components.

3. The method of claim 2 wherein the windowing index begins at the earliest estimated arrival of the compressional wave and ends at the latest estimated arrival of sonic energy.

4. The method of claim 1 wherein the initial window moveout is 40 microseconds per foot and succeeding moveouts at each index position are at 20 microsecond per foot increments.

5. The method of claim 4 wherein the window is a Hanning function and said incrementing takes place at fifty microsecond increments along the length of the received energy.

6. The method of claim 1 wherein the parameter being estimated is slowness and those estimates obtained in step (g) and accepted are those falling within a predetermined range of the value of slowness represented by the window moveout associated with the estimate.

7. The method of claim 6 wherein the range is plus of minus ten microseconds per foot.

8. The method of claim 6 wherein the accepted estimates of slowness are clustered for each wave of interest and a single value of each cluster of estimates is obtained.

9. The method of claim 8 wherein said single values are plotted as a function of depth along the borehole to produce a slowness log.

10. The method of claim 1 wherein the estimates of parameters in accordance with step (g) are performed with a Prony estimation algorithm said algorithm yielding complex roots.

11. The method of claim 10 wherein the slowness is derived from the argument of said complex roots.

12. The method of claim 10 wherein the parameter estimated is signal attenuation and said attenuation is obtained from the absolute values of said complex roots.

13. A method of estimating parameters of composite acoustic waves arriving sequentially at a plurality of points spaced vertically along the length of a borehole comprising the steps of:
   (a) generating acoustic energy in the borehole,
   (b) receiving the acoustic energy at each of the points after refraction, reflection and direct transmission through and along a formation adjacent the borehole to produce a composite acoustic wave the parameters of which are to be estimated,
   (c) establishing a window of predetermined length and moveout,
   (d) positioning said window along the wave,
   (e) multiplying the energy received at each point by the window,
   (f) generating the Fourier transform of that portion of received energy multiplied by the window, to produce a plurality of complex signals in the frequency domain,
   (g) modeling said complex singals as a sum of exponentials having exponents proportional to a spatial frequency, the spatial frequency being the product of slowness by a temporal frequency,
   (h) determining the spatial frequencies using a Prony estimation algorithm,
   (i) calculating the slowness for each spatial frequency, at each of a plurality of temporal frequencies,
   (j) selecting the best estimate of slowness, and
   (k) plotting said best estimate as a function of depth to produce a sonic log.

14. The method of claim 13 in which step (j) is performed by clustering the estimates of step (i) as a function of slowness, frequency and time, and assigning to each cluster a value of slowness based on a weighted combination of the members of each cluster to obtain a best estimate of slowness.

15. An acoustic logging system for determining the acoustic slowness characteristics of waves propagated through an earth formation, said waves including compressional and shear waves, comprising:
   (a) an acoustic borehole logging tool having at least eight serially spaced acoustic receivers and at least one acoustic transmitter,
   (b) means for generating waveform outputs representative of the acoustic waves propagated through different lengths of substantially the same formation intervals and between different transmitter receiver pairs in response to each burst of acoustic energy from said transmitter, the waveforms being displaced in time according to their differential propagation times and rates through the formation interval, (c) means for establishing a window of predetermined length and moveout, (d) means for multiplying the waveform outputs by said window along a plurality of moveouts of said window taken at each of a plurality of spaced index points along the waveforms to produce windowed segments of said waveforms outputs, (e) means for generating a Fourier transform of said window segments to produce complex signals in the frequency domain, (f) means for computing from said complex signals for each window moveout and each index position values of slowness of propagation of said waveforms said means for computing including a model for wave propagation defining a superposition of acoustic wave propagating at different velocities, (g) means for accepting only those computed values of slowness falling within a predetermined range of the value of slowness represented by the window moveout associated with the computation, (h) means for selecting from said accepted values of slowness a single value of slowness for each mode of wave propagation, and (i) means for plotting each of the single values of slowness as a function of depth of said logging tool.

16. The system of claim 15 wherein said receivers are spaced six inches apart to provide an unambiguous spatial frequency range of two cycles per foot.

17. The system of claim 15 wherein said window has a length of 500 microseconds, the index points are spaced 50 microseconds and said moveouts begin at 40 microseconds per foot.

18. The system of claim 15 in which said selecting means including means for clustering said accepted values of slowness, and means for assigning to each cluster a value of slowness based on a weighted combination of the members of each cluster to obtain said single values of slowness.

19. The system of claim 15 in said means for computing includes a model for wave propagation defining a superposition of acoustic waves propagating at different velocities.

20. A system of estimating parameters of composite acoustic waves arriving sequentially at a plurality of points spaced vertically along the length of a borehole to produce a sonic log comprising:

(a) means for generating acoustic energy in the borehole, (b) means for receiving the acoustic energy at each of the points after refraction, reflection and direct transmission through and along a formation adjacent the borehole, (c) means for establishing a window of predetermined length and moveout, (d) means for positioning said window along the wave, (e) means for multiplying the energy received at each point by the window, (f) means for generating the Fourier transform of that portion of received energy multiplied by the window, to produce a plurality of complex signals in the frequency domain, (g) means for modeling said complex signals as the sum of exponentials with unknown spatial frequencies, (h) means for determining the spatial frequencies using a Prony estimation algorithm, (i) means for calculating the slowness for each spatial frequency, at each of a plurality of temporal frequencies, (j) means for selecting the best estimate of slowness, and (k) means for plotting said best estimate as a function of depth to produce a sonic log.

* * * * *